United States Patent Office 3,536,279
Patented Oct. 27, 1970

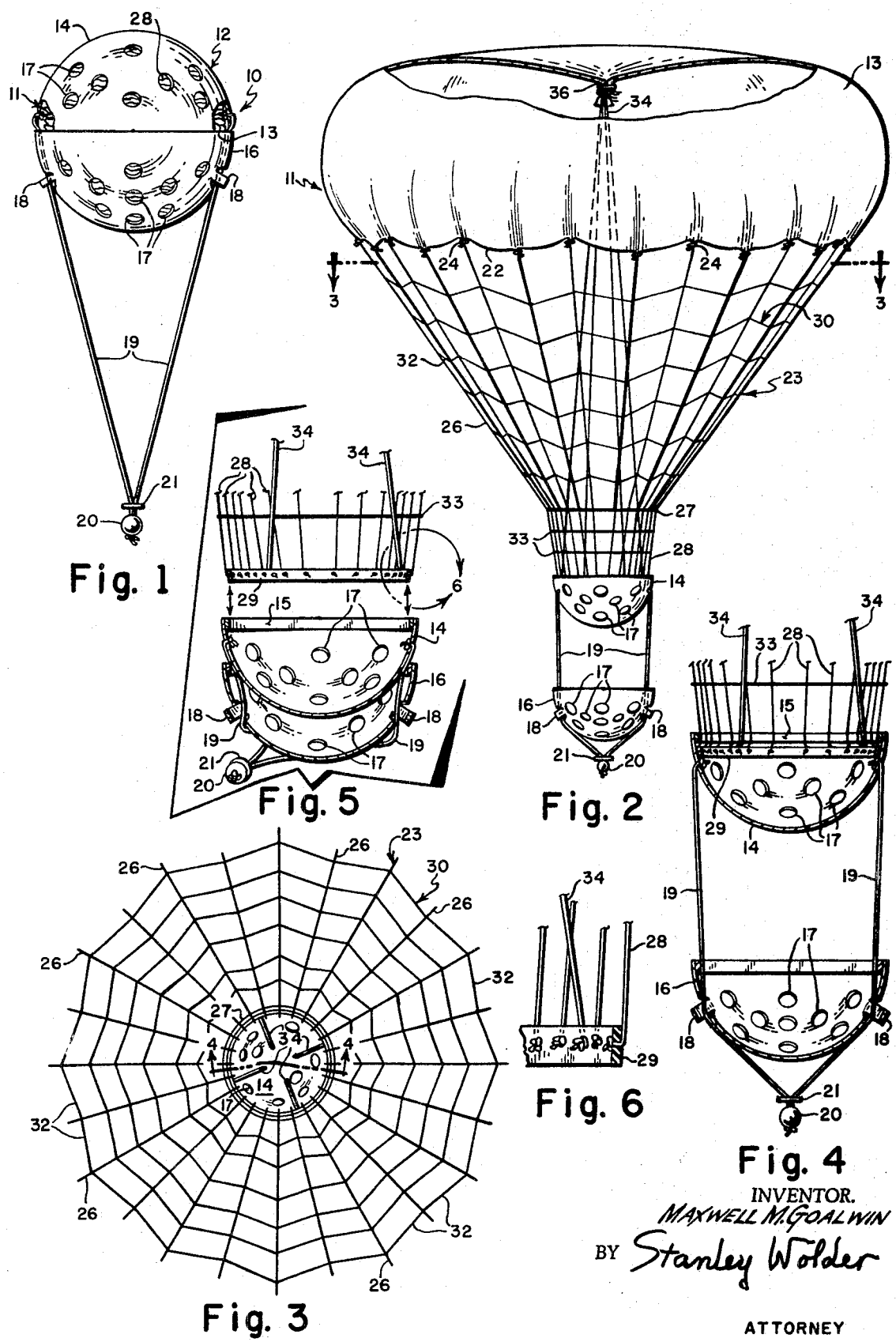

3,536,279
PARACHUTE DEVICE
Maxwell M. Goalwin, New York, N.Y.
(11740 Wilshire Blvd., Los Angeles, Calif. 90025)
Filed July 30, 1968, Ser. No. 748,780
Int. Cl. B64d *17/24, 17/44*
U.S. Cl. 244—142                       12 Claims

ABSTRACT OF THE DISCLOSURE

A parachute device includes a pair of separable housing defining perforate shells connected by a pair of lines joined at one end to a weight and extending through opposite apertured lugs on one shell to the other shell. The parachute is compressed and releasably held in the housing and includes a canopy connected by shrouds to a ring which releasably engages one shell. The upper parts of the shrouds are interconnected by zig-zag peripheral lines and the lower parts of the shrouds are interconnected by planes on peripheral lines. The top of the canopy is depressed by shortened lines extending from the canopy center to the ring.

BACKGROUND OF THE INVENTION

The present invention relates generally to improvements in parachute devices and it relates more particularly to an improved parachute device which may be projected or flung into the air in a collapsed condition and which automatically opens near the apex of its trajectory.

For use as a toy or the like as well as for many other uses it is desirable to project a parachute high into the air and have it return slowly to earth. Many types of parachute devices have been used and proposed to this end which are generally of a structure which maintain the parachute in a collapsed state during its upward flight through the air and effects the expansion and bellowing of the parachute as it begins its descent from the apex of its trajectory. However, the parachute devices of the above nature which have been heretofore employed and described possess numerous drawbacks and disadvantages. They are generally relatively bulky devices which are difficult to manually project to any great heights with or without such auxiliary aids as slingshots and the like. Moreover they are highly unreliable, often failing to open and rapidly falling to earth, or the canopy shrouds and gondola become entangled likewise permitting a rapid descent. Furthermore, these parachute devices are frequently difficult and time consuming to ready for projection and otherwise leave much to be desired.

SUMMARY OF THE INVENTION

It is a principal object of the present invention to provide an improved parachute device.

Still another object of the present invention is to provide an automatically opening projectile type parachute device which may be easily thrown, slung or catapulted to high altitudes.

A further object of the present invention is to provide a projectile type parachute device which possesses superior aerodynamic properties, is easy and convenient to reload, is safe and reliable and is highly versatile, adaptable and rugged.

The above and other objects of the present invention will become apparent from a reading of the following description taken in conjunction with the accompanying drawing which illustrates a preferred embodiment thereof.

In a sense the present invention contemplates the provision of a parachute device comprising a housing including a pair of separable first and second shell members, a parachute member including a canopy and shrouds extending from the periphery of said canopy to said first shell member and secured thereto, and disposable in a compressed condition in said housing, a weight member, and at least one line relatively movably joining said shell members and extending from said weight member and secured at its end to said first shell member, and connected between its ends in sliding engagement with said second shell member. A feature of the device resides in the provision of a ring member with the shrouds converging from the canopy to the ring member and a peripheral line extending about and connected to the shrouds at a level between the canopy and ring. Advantageously a plurality of peripheral lines at different levels are provided, those at the higher levels being of zig-zag configuration and those at the lower levels being planar. Another feature is the provision of a line extending from the center of the canopy to the ring to depress the center sections of the canopy.

According to a preferred form of the parachute device, the shell members are hemispherical and perforate, and a pair of lines extends from the weight member through apertured ears in the second shell member to the first shell member. The ends of the shrouds are connected to a ring which is replacably nested in the first shell member and in its loaded condition the parachute is under compression and biases the housing defining shell members outwardly. The shrouds converge downwardly from the canopy to a predetermined level and then converge at a lesser angle below said first level, the peripheral line being zig-zag above said level and planar below said level.

The structure of the improved parachute device permits its being easily flung to high altitudes either manually or tool assisted and assures the opening of the parachute in an untangled state at the apex of the trajectory. Further, the construction of the shrouds and canopy provides for an optimum descent path and prevents any hazardous use of the canopy by children, when used as a toy.

BRIEF DESCRIPTION OF THE DRAWING

FIG. 1 is a front elevational view, partially fragmented, of the improved parachute device shown in a packed condition;

FIG. 2 is a front elevational view thereof partially fragmented, of the device shown in a fully extended state;

FIG. 3 is a sectional view taken along line 3—3 in FIG. 2;

FIG. 4 is a sectional view taken along line 4—4 in FIG. 3;

FIG. 5 is a view similar to FIG. 4 with the parachute section illustrated in a detached condition; and FIG. 6 is a detailed front fragmentary view of the parachute coupling ring, taken along line 6—6 in FIG. 5.

DESCRIPTION OF THE PREFERRED EMBODIMENT

Referring now to the drawing which illustrates a preferred embodiment of the present invention, the reference numeral 10 generally designates the improved projectile parachute which comprises a parachute section 11 and a releasable parachute housing section 12. The parachute section 11 includes a canopy 13 which is advantageously formed of a thin highly flexible, organic thermoplastic resin film, for example, polyethylene, saran, Mylar or the like, although it may be formed of a woven nylon, polyester or other suitable web. The canopy 13, in its bellowed condition is upwardly generally convex and its center section is depressed or upwardly concave, such depression being assured by the shroud structure as will be hereinafter explained.

The housing section 12 includes complementary upper and lower hemispherical shells 14 and 16 respectively, the shells 14 and 16 having apertures 17 throughout its full area and being formed of a thin light weight, shape-retaining material, such as organic thermoplastic sheet, for example, polypropylene, or the like and are fabricated in any suitable manner. An upwardly directed peripheral lip or retainer ring 15 is positioned along and secured to or integrally formed with the top inner border of the upper shell 14.

The lower shell 16 is of substantially the same dimensions as the upper shell 14 and is provided in its outer face between the top and bottom thereof with a pair of oppositely disposed outwardly directed apertured lugs or ears 18. A pair of closure lines 19 are joined at their lower ends and connected to a small weighted element 20 such as a metal or plastic sphere, or bead. The lines 19 diverge from the element 20 and extend through respective apertured ears 18 and then inwardly through a pair of diametrically opposite apertures 17 directly below the outer peripheral edge of the shell member 16. The outer ends of the lines 19 are connected to the upper peripheral border of the upper shell 14 at opposite points thereon. A button or ring 21 slidably engages the lines 21 and is movable upwardly along the lengths thereof toward the shell 16 to draw and releasably hold the upper portions of the lines 19 together below the shell 16, the button 21 being restricted against separation from the lines 19.

The lower peripheral edge of the canopy 13 may be scalloped, as at 22. A shroud 22 has its upper end connected to each of the cusps 24 of the scalloped edge 22 in any suitable manner such as by heat-sealing adhesive or the like, or a tail may be integrally formed with each of the cusps 24 and knotted to the ends of corresponding shrouds 23, as shown. The upper points 26 of the shrouds 23 converge downwardly at a predetermined uniform angle from the canopy 13 to an intermediate circular line 27 which is secured to each of the shrouds 23 at points equidistant from the canopy 13 in any suitable manner. The lower parts 28 of the shrouds 23 below the circular line 27 converge downwardly at a lesser angle than the upper shroud parts 26 and are secured at their lower ends to a preferably resilient coupling ring 29 of approximately the same as or slightly less than the diameter of the retainer ring 15. The ring 29 may be provided with peripherally spaced apertures which are engaged by the ends of shrouds 23 which are then knotted or tied or the shrouds 23 may be otherwise secured to the coupling ring 29. The coupling ring 29, is normally positioned in the lower shell 14 below the ring 15 and abutting the underface thereof and may be released therefrom or applied thereto by compressing the resilient ring 29 thereby facilitating the replacement of the parachute member 11.

A plurality of vertically spaced horizontal zig-zag circular lines 30 are positioned between the canopy 13 and intermediate circular line 27 and each line 30 is suitably secured to the shrouds 23 at consecutively higher and lower levels so that the successive legs 32 of the corresponding circular line 30 are successively upwardly and downwardly inclined. A plurality of vertically spaced horizontal flat circular lines 33 are positioned between the coupling ring 29 and the intermediate circular line 27. The shrouds 23 and circular lines 30 and 32 are advantageously formed from a fine light-weight highly flexible monofilament or yarn, for example, a low denier multifilament nylon or similar yarn.

A plurality of shrouds 34 for example four, are suitably secured at their upper ends to the apex 36 and are secured at their lower ends to equally circumferentially spaced points in the coupling ring 29. The shrouds 34 are of a material similar to shrouds 23 and are of such a length relative thereto as to effect the depression of the apex 36 below the level of the surrounding area of the canopy 13 and form a corresponding depression in the bellowed canopy 13.

Considering now the operation of the improved parachute device 10, the canopy 13 is folded and collapsed in a Z-shaped fashion and compressed and the parachute shrouds and lines are folded together therewith and compressed into a tight resilient self-expanding bundle which is positioned in the upper shell 14. The lower shell 16 is slid along the lines 19 and brought into closing engagement with the upper shell 14 to enclose the collapsed parachute section. A preferable manner of projecting the parachute to a high altitude is by grasping the element 20 and whirling the parachute holding housing 12 and thereafter releasing the element 20 to fling the parachute device 10 in an upward trajectory, the housing 12 being maintained closed by reason of the centrifugal force. The housing 12 remains closed in its upward travel and as it slows down proximate the top of its trajectory, the closing force on the housing 12 is sufficiently diminished or relieved so that the shells 14 and 16 are separated. The housing 12 opens under the influence of the expanding parachute 11 consequent to the outward urging thereof because of its compressed state and the relatively rapidly moving ambient air, particularly during the initial downward descent of the device 10. The air then catches the canopy to expand to its fully bellowed condition and the parachute carrying the shells 14 and 16 connected by lines 19 slowly falls downwardly.

It should be noted that other procedures and means may be employed for projecting the parachute device 10 in its upward trajectory and that it may be used as a game or toy or for other uses. By reason of the arrangement of the shrouds and circle lines fouling or entanglement of the canopy and shrouds is obviated, suitable opening of the parachute assured and an excellent glide path accomplished.

While there has been described and illustrated a preferred embodiment of the present invention, it is apparent that numerous alterations, omissions and additions may be made without departing from the spirit thereof.

What is claimed is:

1. A parachute device comprising a housing including a pair of separable first and second shell members, a parachute member including a canopy and shrouds extending from the periphery of said canopy to said first shell member and secured thereto and disposable in a compressed condition in said housing, a weight member, and a plurality of lines relatively movably joining said shell members and extending from said weight member and secured at their ends to said first shell member, said lines between their respective ends slideably engaging said second shell member at spaced points thereon whereby said second shell member is slideable along the lengths of said lines.

2. The parachute device of claim 1 including a coupling ring releasably engaging the peripheral border of said first shell member, said shrouds being secured to peripherally spaced points along said coupling ring.

3. The parachute device of claim 1 including a pair of apertured guide lugs positioned on opposite sides of said second shell member, and a pair of said connecting lines slidably engaging said guide lugs.

4. The parachute device of claim 1 wherein said shell members are perforated.

5. The parachute device of claim 1 wherein said collapsed parachute member positioned in said housing normally biases said shell members to a housing open position.

6. The parachute device of claim 1 including at least one shroud line extending from the center of said canopy to said first shell member and of a length to depress said canopy center section when said canopy is bellowed outwardly and said shrouds are in their fully extended conditions.

7. The parachute device of claim 1 including a peripherally extending line connected to said shrouds at corresponding levels along said shrouds.

8. The parachute device of claim 7 wherein successive legs of said peripherally extending line are oppositely inclined between adjacent shrouds to define a zig-zag peripheral line.

9. The parachute of claim 7 wherein said peripheral line is of zig-zag configuration, and joined to consecutive shrouds at successively higher and lower levels.

10. The parachute of claim 7 wherein said shrouds converge at a greater angle from said canopy to said peripheral line than from said peripheral line to said first shell member.

11. The parachute of claim 7 comprising a plurality of said peripheral lines positioned at different levels along said shrouds.

12. The parachute of claim 11 wherein the upper peripheral lines are of zig-zag configuration and the lower peripheral lines are planar.

References Cited
UNITED STATES PATENTS

| | | | |
|---|---|---|---|
| 494,261 | 3/1893 | Perkins | 244—148 |
| 517,671 | 4/1894 | Tiefel | 48—86 |
| 1,855,320 | 4/1932 | Schwabek | 244—142 |
| 2,258,797 | 10/1941 | Overbeke | 244—145 |
| 2,495,873 | 1/1950 | Strong | 244—145 |
| 3,055,141 | 9/1962 | Starkl | 46—86 |
| 3,073,555 | 1/1963 | Barish | 244—145 |

MILTON BUCHLER, Primary Examiner

J. E. PITTENGER, Assistant Examiner

U.S. Cl. X.R.

46—86